United States Patent
Sugimoto

(10) Patent No.: US 7,593,589 B2
(45) Date of Patent: Sep. 22, 2009

(54) IMAGE PROCESSING DEVICE FOR PROCESSING AN IMAGE INCLUDING MULTIPLE PIXELS TO CREATE A NEW IMAGE BY EMPHASIZING EDGES OF AN IMAGE

(75) Inventor: Tasuku Sugimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 955 days.

(21) Appl. No.: 10/791,868

(22) Filed: Mar. 4, 2004

(65) Prior Publication Data
US 2004/0234161 A1 Nov. 25, 2004

(30) Foreign Application Priority Data
Mar. 4, 2003 (JP) ............................ P2003-057333

(51) Int. Cl.
*G06K 9/40* (2006.01)
(52) U.S. Cl. ...................... 382/266; 382/263; 382/254; 382/261
(58) Field of Classification Search ................. 382/254, 382/266, 263, 275, 199, 200
See application file for complete search history.

(56) References Cited

U.S. PATENT DOCUMENTS

| | | | |
|---|---|---|---|
| 4,941,191 A * | 7/1990 | Miller et al. | 382/261 |
| 6,415,053 B1 * | 7/2002 | Norimatsu | 382/199 |
| 7,155,067 B2 * | 12/2006 | Jayant et al. | 382/268 |
| 2001/0031097 A1 * | 10/2001 | Mancuso et al. | 382/264 |

* cited by examiner

*Primary Examiner*—Brian Q Le
*Assistant Examiner*—Edward Park
(74) *Attorney, Agent, or Firm*—Oliff & Berridge, PLC

(57) ABSTRACT

An image processing device emphasizes edges of an image without changing the image. A differential operation is performed on pixel values of a subject pixel and surrounding pixels to calculate a vector magnitude and a vector direction of a differential vector. Then, a new pixel value of the subject pixel is calculated based on the original pixel value of the subject pixel, a value determined dependently on the vector magnitude, and a pixel value of an adjustment pixel. The adjustment pixel is one of a first candidate surrounding pixel positioned in the vector direction and a second candidate surrounding pixel positioned in an opposite vector direction, and has a pixel value closer to the original pixel value of the subject pixel than the other candidate surrounding pixel.

7 Claims, 10 Drawing Sheets

| -1 | 0 | 1 |
|---|---|---|
| -2 | 0 | 2 |
| -1 | 0 | 1 |

X-DIRECTION H(i, j)

| -1 | -2 | -1 |
|---|---|---|
| 0 | 0 | 0 |
| 1 | 2 | 1 |

Y-DIRECTION V(i, j)

| -1 | 0 | 1 |
|----|---|---|
| -1 | 0 | 1 |
| -1 | 0 | 1 |

X-DIRECTION H(i, j)

| -1 | -1 | -1 |
|----|----|----|
| 0  | 0  | 0  |
| 1  | 1  | 1  |

Y-DIRECTION V(i, j)

IMAGE PROCESSING DEVICE FOR PROCESSING AN IMAGE INCLUDING MULTIPLE PIXELS TO CREATE A NEW IMAGE BY EMPHASIZING EDGES OF AN IMAGE

BACKGROUND OF THE INVENTION

1. Field of the Invention

The present invention relates to an image processing device, an image processing method, and a storage medium for performing an image processing operation of emphasizing edges of an image.

2. Description of Related Art

Conventionally, when the resolution of an image is not sufficient, for example, a bicubic method is employed for providing additional pixels by interpolation to improve the resolution (resolution conversion). Normally, a median value is used for each additional pixel in order to smooth the tone. Then, however, the entire image can appear as if it were out of focus. To correct this problem, a method of unsharp masking by a Laplacian filter is used to emphasize the edges of the image to a certain extent.

SUMMARY OF THE INVENTION

A "3×3 matrix/four-neighborhood Laplacian filter" will be described below as an example of filter for edge emphasis. As shown in FIG. 1, a 3×3 matrix is formed by a subject pixel G4 and eight surrounding pixels G0, G1, G2, G3, G5, G6, G7, and G8. As shown in FIG. 2, filter coefficients of the 3×3 matrix by the "3×3 matrix/four-neighborhood Laplacian filter" can be represented by means of operators.

Thus, the filter coefficient H(i, j) for the subject pixel G4 is determined by the equation below.

$$H(i,j) = f(i-1,j) + f(i,j-1) + f(i,j+1) + f(i+1,j) - 4 \times f(i,j)$$

where f(i−1, j), f(i, j−1), f(i, j+1), f(i+1, j) and f(i, j) are respectively the pixel values of pixels G1, G3, G5, G7 and G4 before adjustment.

A pixel value g(i, j) of the subject pixel G4 after adjustment is expressed by the equation below:

$$g(i,j) = f(i,j) - K \times H(i,j)$$

where K is a predetermined constant.

FIG. 3 shows the result of an edge emphasizing operation using a "3×3 matrix/four-neighborhood Laplacian filter" that is shown one-dimensionally. In FIG. 3, the broken line indicates the pixel values of an original image before the edge emphasizing operation (adjustment), whereas the solid line indicates the pixel values of a processed image obtained after the edge emphasizing operation. As shown in. FIG. 3, the slopes of the pixel values (solid line) after the edge emphasizing operation are steeper than the corresponding slopes of the pixel values (broken line) before the edge emphasizing operation. Thus, the edges of the processed image are emphasized as a result of the edge emphasizing operation.

As shown in FIG. 3, however, when a "3×3 matrix/four-neighborhood Laplacian filter" is used, while the pixel values of the original image are found within a range between 20 and 120, those of the processed image are found within a range between 10 and 130. Thus, pixel values that are out of the range of the pixel values of the original image (those corresponding to pixel values between 10 and 20 and between 120 and 130) are used in the processed image. In shorts, the use of a "3×3 matrix/four-neighborhood Laplacian filter" entails a problem that pixel values that are out of the range of the pixel values of the original image are used to consequently change the original image, although the edges of the processed image are emphasized.

In view of the above-described drawbacks, it is an objective of the present invention to provide an image processing device, an image processing method, and a storage medium with which the processed image is not changed from the original image when the edges of the image are emphasized.

In order to attain the above and other objects, the present invention provides an image processing device for processing an original image including multiple pixels to create a new image. Each of the multiple pixels has a pixel value. The device includes an extracting unit, a first calculating unit, a second calculating unit, and a setting unit. The extracting unit extracts, from multiple pixel values of multiple pixels, an original pixel value of a subject pixel and pixel values of surrounding pixels that are positioned to surround the subject pixel. The subject pixel and the surrounding pixels are arranged in a matrix configuration. The first calculating unit calculates a differential vector for the subject pixel by performing a differential operation on the pixel values of the surrounding pixels and calculates a vector magnitude of the differential vector and a vector direction of the differential vector. The second calculating unit calculates a new pixel value of the subject pixel based on the original pixel value of the subject pixel, a value determined dependently on the vector magnitude, and a pixel value of an adjustment pixel. The adjustment pixel is one of at least one first candidate surrounding pixel and at least one second candidate surrounding pixel. The at least one first candidate surrounding pixel is positioned in the vector direction. The at least one second candidate surrounding pixel is positioned in an opposite vector direction opposite to the vector direction. The adjustment pixel has a pixel value closest to the original pixel value of the subject pixel among the at least one first candidate surrounding pixel and the at least one second candidate surrounding pixel. The setting unit sets the new pixel value to the subject pixel, thereby obtaining a new image.

The present invention also provides an image processing device for processing an original image including multiple pixels to create a new image. Each of the multiple pixels has a pixel value. The device includes an extracting unit, a first calculating unit, a second calculating unit, and a setting unit. The extracting unit extracts, from multiple pixel values of multiple pixels, an original pixel value of a subject pixel and pixel values of surrounding pixels that are positioned to surround the subject pixel. The subject pixel and the surrounding pixels are arranged in a 3×3 matrix configuration. The first calculating unit calculates a differential vector for the subject pixel by performing a differential operation on the pixel values of the surrounding pixels and calculates a vector magnitude of the differential vector and a vector direction of the differential vector. The second calculating unit calculates a new pixel value of the subject pixel based on the original pixel value of the subject pixel, a value determined dependently on the vector magnitude, and a pixel value of an adjustment pixel. The adjustment pixel is one of a first candidate surrounding pixel positioned in the vector direction and a second candidate surrounding pixel positioned in an opposite vector direction opposite to the vector direction. The adjustment pixel has a pixel value closer to the original pixel value of the subject pixel than the other candidate surrounding pixel. The setting unit sets the new pixel value to the subject pixel, thereby obtaining a new image.

The present invention also provides an image processing method of processing an original image including multiple pixels to create a new image. Each of the multiple pixels has a pixel value. The method includes extracting an original pixel value of a subject pixel and pixel values of surrounding pixels that are positioned to surround the subject pixel, the subject pixel and the surrounding pixels being arranged in a matrix configuration, calculating a differential vector for the subject pixel by performing a differential operation on the pixel values of the surrounding pixels and calculating a vector magnitude of the differential vector and a vector direction of the differential vector, calculating a new pixel value of the subject pixel based on the original pixel value of the subject pixel, a value determined dependently on the vector magnitude, and a pixel value of an adjustment pixel, the adjustment pixel being one of at least one first candidate surrounding pixel and at least one second candidate surrounding pixel, the at least one first candidate surrounding pixel being positioned in the vector direction, the at least one second candidate surrounding pixel being positioned in an opposite vector direction opposite to the vector direction, the adjustment pixel having a pixel value closest to the original pixel value of the subject pixel among the at least one first candidate surrounding pixel and the at least one second candidate surrounding pixel, and setting the new pixel value to the subject pixel, thereby obtaining a new image.

The present invention also provides a storage medium for storing a program of processing an original image including multiple pixels to create a new image. Each of the multiple pixels has a pixel value. The program includes the programs of extracting, from multiple pixel values of multiple pixels, an original pixel value of a subject pixel and pixel values of surrounding pixels that are positioned to surround the subject pixel, the subject pixel and the surrounding pixels being arranged in a matrix configuration, calculating a differential vector for the subject pixel by performing a differential operation on the pixel values of the surrounding pixels and calculating a vector magnitude of the differential vector and a vector direction of the differential vector, calculating a new pixel value of the subject pixel based on the original pixel value of the subject pixel, a value determined dependently on the vector magnitude, and a pixel value of an adjustment pixel, the adjustment pixel being one of at least one first candidate surrounding pixel and at least one second candidate surrounding pixel, the at least one first candidate surrounding pixel being positioned in the vector direction, the at least one second candidate surrounding pixel being positioned in an opposite vector direction opposite to the vector direction, the adjustment pixel having a pixel value closest to the original pixel value of the subject pixel among the at least one first candidate surrounding pixel and the at least one second candidate surrounding pixel, and setting the new pixel value to the subject pixel, thereby obtaining a new image.

BRIEF DESCRIPTION OF THE DRAWINGS

The above and other objects, features and advantages of the invention will become more apparent from reading the following description of the preferred embodiments taken in connection with the accompanying drawings in which:

FIG. 9($a$) is an explanatory diagram showing an operator expression of filter coefficients of a "3×3 matrix/Sobel filter" in x-direction;

FIG. 9($b$) is an explanatory diagram showing an operator expression of filter coefficients of the "3×3 matrix/Sobel filter" in y-direction;

FIG. 13($a$) is an explanatory diagram showing an operator expression of filter coefficients of a "3×3 matrix/Prewitt filter" in x-direction;

FIG. 13($b$) is an explanatory diagram showing an operator expression of filter coefficients of the "3×3 matrix/Prewitt filter" in y-direction.

DETAILED DESCRIPTION OF THE PREFERRED EMBODIMENTS

An image processing device, an image processing method, and a storage medium according to preferred embodiments of is the present invention will be described while referring to the accompanying drawings.

A laser printer 1 according to an embodiment of the present invention will be described with reference to FIGS. 4 through 12.

Figure 4:
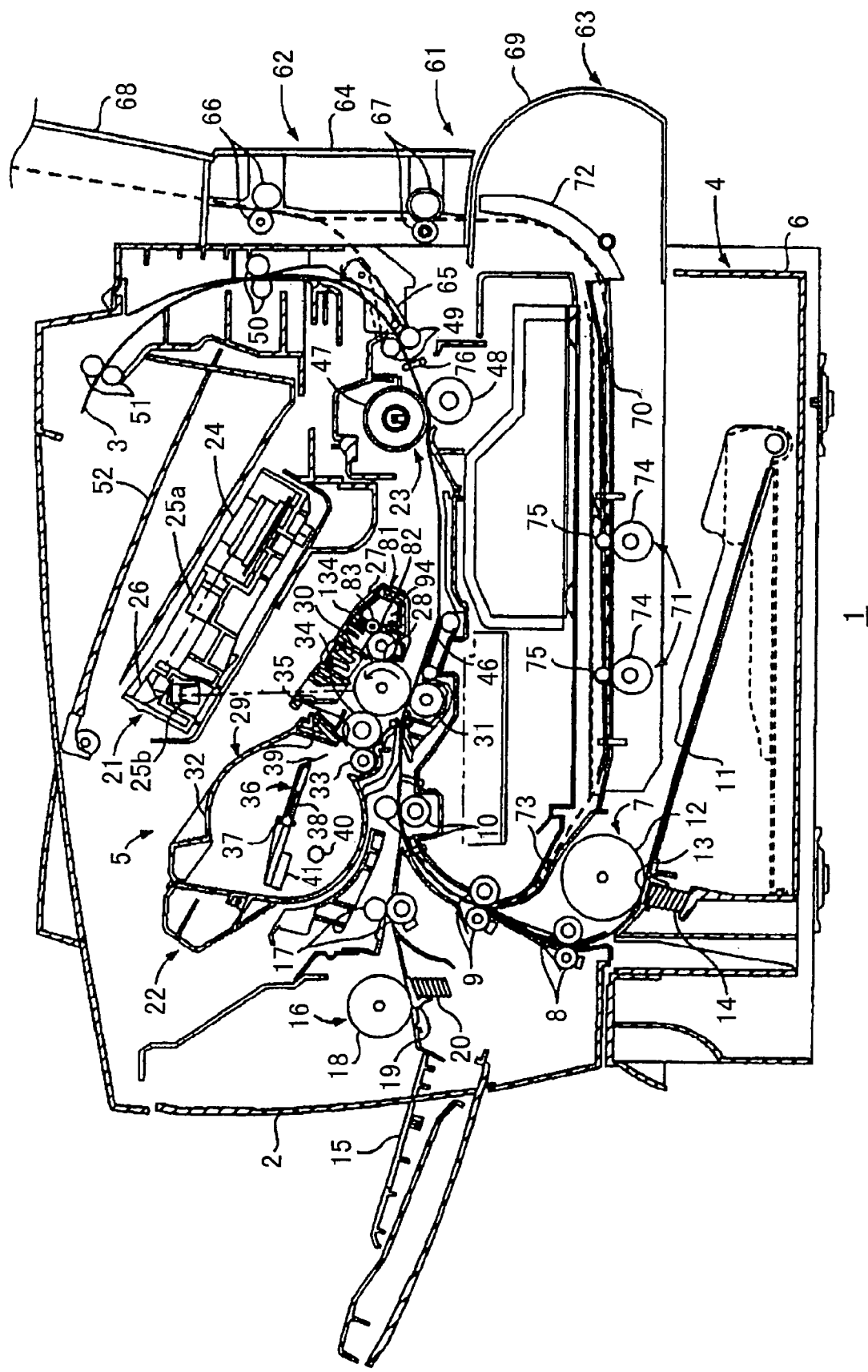
FIG. 4 is a cross-sectional side view of a laser printer according to an embodiment of the present invention.

As shown in FIG. 4, the laser printer 1 is for forming images using an electrophotographic image forming technique by using a non-magnetic, single-component toner. A feeder section 4 and an image forming section 5 are provided within a casing 2 of the laser printer 1. The feeder section 4 is for supplying sheets 3. The image forming section 5 is for forming desired images on the supplied sheets 3.

The feeder section 4 is located within the lower section of the casing 2, and includes a sheet supply tray 6, a sheet feed mechanism 7, transport rollers 8 and 9, and registration rollers 10. The sheet supply tray 6 is detachably mounted to the casing 2. The sheet feed mechanism 7 is provided at one end of the sheet supply tray 6. The transport rollers 8 and 9 are provided downstream from the sheet feed mechanism 7 with respect to a sheet transport direction, in which sheets 3 are transported. The registration rollers 10 are provided downstream from the transport rollers 8 and 9 in the sheet transport direction.

The sheet supply tray 6 has a box shape with the upper side open so that a stack of sheets 3 can be housed therein. The sheet supply tray 6 can be moved horizontally into and out from the lower section of the casing 2 so as to be detachable from the casing 2. In the sheet supply tray 6, a sheet pressing plate 11 is provided. The sheet pressing plate 11 is capable of supporting a stack of sheets 3 thereon. The sheet pressing plate 11 is pivotably supported at its end furthest from the sheet feed mechanism 7 so that the end of the sheet pressing plate 11 that is nearest to the sheet feed mechanism 7 can move vertically. Although not shown in the drawing, a spring for urging the sheet pressing plate 11 upward is provided to the rear surface of the sheet pressing plate 11. Therefore, the sheet pressing plate 11 pivots downward in accordance with increase in the amount of stacked sheets 3 on the sheet pressing plate 11. At this time, the sheet pressing plate 11 pivots around the end of the sheet pressing plate 11 farthest from the sheet feed mechanism 7, downward against the urging force of the spring.

The sheet feed mechanism 7 is provided with a sheet supply roller 12, a separation pad 13 and a spring 14. The separation pad 13 is disposed in confrontation with the supply roller 12. The spring 14 is disposed to the rear side of the separation pad 13 and urges the separation pad 13 to press against the supply roller 12. With this configuration, the uppermost sheet 3 on the sheet pressing plate 11 is pressed toward the supply roller 12. Rotation of the supply roller 12 pinches the uppermost sheet 3 between the supply roller 12 and the separation pad 13. Then, cooperative operation between the supply roller 12 and the separation pad 13 separates one sheet 3 at a time from the stack and supplies the sheet 3 downstream in the sheet transport direction. The transport rollers 8 and 9 send the supplied sheets 3 to the registration rollers 10.

The registration rollers 10 are a pair of rollers that send a sheet 3 to an image forming position, while preventing the sheet 3 from being transported obliquely. The image forming position is the contact position where the photosensitive drum 28 and a transfer roller 31 contact each other.

The feeder section 4 further includes a multipurpose tray 15, a multipurpose sheet supply mechanism 16, and multipurpose transport rollers 17. The multipurpose tray 15 can receive a stack of sheets 3 with any size. The multipurpose sheet supply mechanism 16 is for supplying sheets 3 on the multipurpose tray 15.

The multipurpose sheet supply mechanism 16 includes a multipurpose sheet supply roller 18, a multipurpose separation pad 19, and a spring 20. The multipurpose separation pad 19 is disposed in confrontation with the multipurpose sheet supply roller 18. The spring 20 is disposed to the underside of the multipurpose separation pad 19. The urging force of the spring 20 presses the multipurpose separation pad 19 against the multipurpose sheet supply roller 18.

With this configuration, rotation of the multipurpose sheet supply roller 18 pinches the uppermost sheet 3 of the stack on the multipurpose tray 15 between the multipurpose sheet supply roller 18 and the multipurpose separation pad 19. Then, cooperative operation between the multipurpose sheet supply roller 18 and the multipurpose separation pad 19 separates one sheet 3 at a time from the stack to supply. Then, the supplied sheet 3 is sent to the registration rollers 10 by the multipurpose transport roller 17.

The image forming section 5 includes a scanner section 21, a process unit 22, and a fixing section 23. The scanner section 21 is provided at the upper section of the casing 2 and is provided with a laser emitting section (not shown), a rotatingly driven polygon mirror 24, lenses 25a and 25b, and a reflection mirror 26. The laser emitting section emits a laser beam based on desired image data. As indicated by two-dot chain line, the laser beam passes through or is reflected by the polygon mirror 24, the lens 25a, the reflection mirror 26, and the lens 25b in this order so as to irradiate, in a high speed scanning operation, the surface of the photosensitive drum 28 of the process unit 22.

Figure 5:
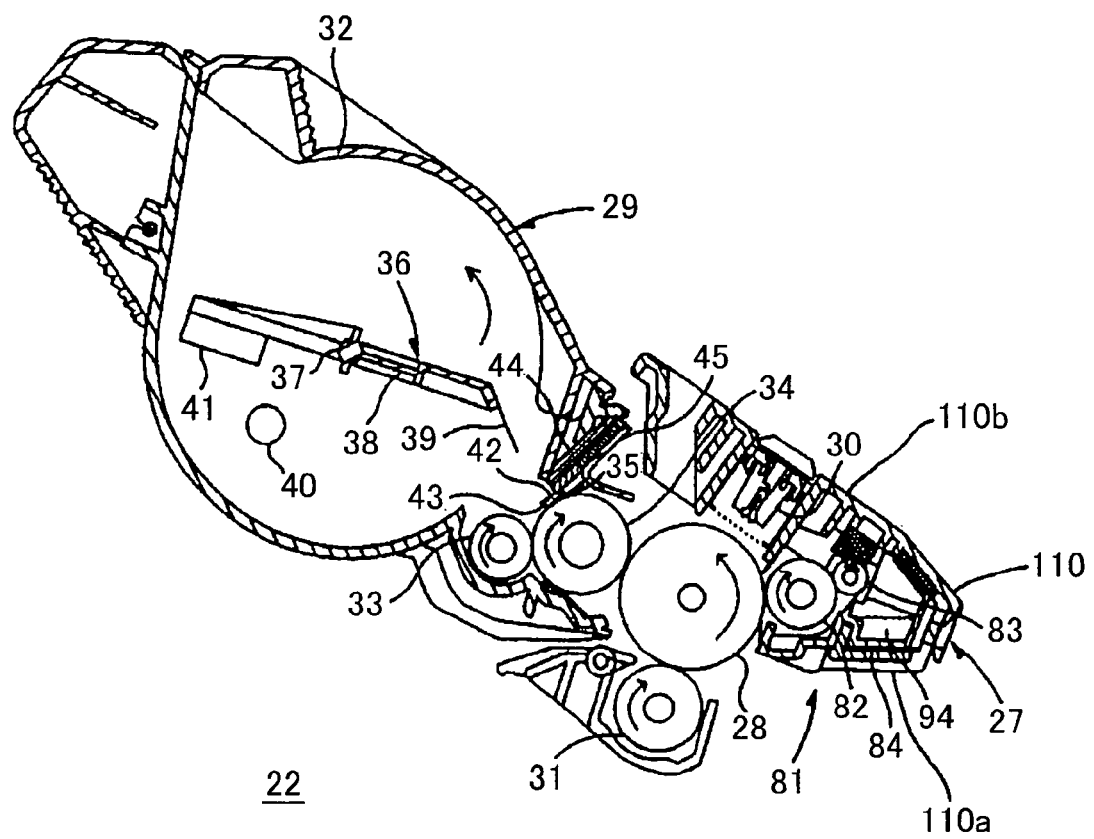
FIG. 5 is an enlarged cross-sectional side view of a process unit of the laser printer shown in FIG. 4.

The process unit 22 is detachably mounted to the casing 2 at a position below the scanner section 21. As shown in FIG. 5, the process unit 22 has a drum cartridge 27, within which the photosensitive drum 28, a scorotron charge unit 30, and the transfer roller 31 are mounted.

The developing cartridge 29 is detachably mounted to the drum cartridge. 27. The developing cartridge 29 includes a toner hopper 32. The developing cartridge 29 further includes a supply roller 33, a developing roller 34, and a layer thickness regulating blade 35, which are disposed to the side of the toner hopper 32.

The toner hopper 32 is filled with positively charged, non-magnetic, single-component toner as a developing agent. For the toner, polymer toner obtained as a result of copolymerizing monomers by following a well-known polymerization technique such as suspension polymerization is used. Examples of polymerizable monomers are styrene monomers such as styrene, and acrylic monomers such as acrylic acid, alkyl (C1-C4) acrylate, alkyle (C1-C4) metaacrylate. Such polymerized toner has substantially sphere shape, and possesses extremely desirable fluidity. Furthermore, a colorant such as carbon black, and wax are combined in such toner. An external agent such as silica is externally attached to the polymerized toner to enhance the fluidity. The average diameter of the particle is approximately between 6 to 10 μm.

An agitator 36 is provided in the toner hopper 32. The agitator 36 includes a rotation shaft 37, an agitation blade 38, and a film 39. The rotation shaft 37 is rotatably supported at the center of the toner hopper 32. The agitation blade 38 is provided around the rotation shaft 37. The film 39 is adhered to the free end of the agitation blade 38. When the rotation shaft 37 rotates in a direction indicated by an arrow, the agitation blade 38 makes a circular movement so that the film 39 scrapes up toner in the toner hopper 32 to transport the toner toward the supply roller 33.

A cleaner 41 is provided to the rotation shaft 37 at an opposite side of the agitation blade 38. The cleaner 41 is for cleaning windows 40 disposed to the side walls of the toner hopper 32. The cleaning windows are used for detecting the remaining amount of toner.

The supply roller 33 is disposed to the side of the toner hopper 32 so as to be rotatable in a direction indicated by an arrow. The supply roller 33 includes a metal roller shaft covered with a roller formed from an electrically conductive urethane sponge material.

The developing roller 34 is disposed to the side of the supply roller 33 so as to be rotatable in a direction indicated by an arrow. The developing roller 34 includes a metal roller shaft covered with a roller formed from an electrically conductive resilient material. In more specific terms, the surface of the developing roller 34 is made from electrically conductive urethane rubber or silicone rubber including, for example, carbon particles. The surface of the roller portion is covered with a coat layer of silicone rubber or urethane rubber that contains fluorine. The developing roller 34 is applied with a predetermined developing bias with respect to the photosensitive drum 28.

The supply roller 33 is disposed in confrontation with the developing roller 34. The supply roller 33 is in contact with the developing roller 34 to a certain extent that the supply roller 33 is compressed against the developing roller 34.

The layer thickness regulating blade 35 is disposed above the supply roller 33 so as to be in confrontation with the developing roller 34 following the axial direction of the developing roller 34, at a position downstream from a confronting position where the developing roller 34 contacts the supply roller 33 and upstream from a confronting position where the developing roller 34 contacts the photosensitive drum 28 with respect to the rotational direction of the developing roller 34. The layer thickness regulating blade 35 includes a leaf spring and a pressing member. The leaf spring is attached to the developing cartridge 29. The pressing member is mounted at the tip of the leaf spring and is formed of electrically-insulating silicone rubber to a semicircle shape when viewed in cross section. The pressing member is pressed onto the surface of the developing roller 34 by resilient force of the plate spring member.

Toner discharged from the toner hopper 32 is supplied to the developing roller 34 by rotation of the supply roller 33. At this time, the toner is charged to a positive charge by friction between the supply roller 33 and the developing roller 34. As the developing roller 34 rotates, the toner supplied on the developing roller 34 enters between the developing roller 34 and the pressing member of the layer thickness regulating blade 35, where the toner is fully charged again and borne on the developing roller 34 in a thin layer of uniform thickness.

The process unit 22 further includes a drum frame 110. The drum frame 110 includes a lower frame 110a and an upper frame 110b, both of which are made from resin. The photosensitive drum 28 is disposed in confrontation with the side of the developing roller 34. The photosensitive drum 28 is supported at the lower frame 110a so as to be rotatable in a direction opposite to a rotating direction of the developing roller 34. The photosensitive drum 28 includes a cylindrical main body that is made from aluminum and is connected to ground, and a photosensitive surface layer made from polycarbonate to have a positively charging nature.

The scorotron charge unit 30 is supported at the upper frame 110b. The scorotron charge unit 30 is disposed in confrontation with the photosensitive drum 28 and separated from the photosensitive drum 28 by a predetermined space so as not to contact the same.

A cleaning unit 81 is provided in the upper frame 110b. The cleaning unit 81 is disposed in an opposite side of the developing roller 34 with respect to the photosensitive drum 28. The cleaning unit 81 temporarily collects residual toner that remains on the surface of the photosensitive drum 28 after toner is transferred onto the sheet 3. The cleaning unit 81 also collects paper powder that adheres to the surface of the photosensitive drum 28 when toner is transferred onto the sheet 3. The cleaning unit 81 is provided with a first cleaning roller 82, a second cleaning roller 83, and a holder member 84 that supports the first cleaning roller 82 and the second cleaning roller 83. The holder member 84 is made from resin, and is provided with a paper powder holding section 94.

After the scorotron charge unit 30 uniformly charges the surface of the photosensitive drum 28 to a positive charge, the surface of the photosensitive drum 28 is exposed by high speed scan of the laser beam from the scanner section 21. As a result, an electrostatic latent image is formed on the photosensitive drum 28 based on the image data.

When the positively-charged toner borne on the surface of the developing roller 34 is brought into contact with the photosensitive drum 28 by rotation of the developing roller 34, the toner on the developing roller 34 is supplied onto the electrostatic latent image on the photosensitive drum 28. That is, the toner is only supplied to the exposed area of positively charged surface of the photosensitive drum 28 whose electric potential has been decreased by the laser beam exposure. As a result, the toner is selectively borne on the photosensitive drum 28 so that the electrostatic latent image is developed into a visible toner image.

The transfer roller 31 is disposed below the photosensitive drum 28 in confrontation with the photosensitive drum 28. The transfer roller 31 is supported in the drum cartridge 27 so as to be rotatable in a direction indicated by an arrow. The transfer roller 31 is an ionic conductive type transfer roller that is made from a metal roller shaft covered by a roller made of ionic conductive rubber material. At times of toner image transfer, a predetermined transfer bias is applied to the transfer roller 31.

As shown in FIG. 4, rotation of the photosensitive drum 28 brings the visible toner image into contact with a sheet 3 that has been supplied by the registration rollers 10 after registration. As a result, the visible toner image borne on the surface of the photosensitive drum 28 is transferred onto the sheet 3 as the sheet 3 passes between the photosensitive drum 28 and the transfer roller 31. Then, the sheet 3 formed with the visible toner image is transported to the fixing section 23 by a transport belt 46.

The fixing section 23 is disposed to the side of and downstream from the process unit 22 in the sheet transport direction. The fixing section 23 includes a thermal roller 47, a pressing roller 48, and transport rollers 49. The thermal roller 47 is provided with a halogen lamp (heater) in a metal base pipe. The pressing roller 48 is disposed below the thermal roller 47 in confrontation with the thermal roller 47 so that the pressing roller 48 presses the thermal roller 47 from down below. The transport rollers 49 are disposed downstream from the thermal roller 47 and the pressing roller 48 with respect to the sheet transport direction.

The sheet 3 transported to the fixing section 23 is thermally fixed with visible images while passing between the thermal roller 47 and the pressing roller 48, and then transported to transport rollers 50 provided on the casing 2. The transport rollers 50 are disposed downstream from the transport rollers 49 in the sheet transport direction for transporting the sheet 3 to discharge rollers 51 positioned above a discharge tray 52 on the casing 2. The discharge rollers 51 discharge the sheet 3 onto the discharge tray 52.

The laser printer 1 further includes a retransport unit 61 that allows forming images on both sides of sheets 3.

The retransport unit 61 includes an inverting mechanism 62 and a retransport tray 63 formed integrally with the inverting mechanism 62. The inverting mechanism 62 is attached externally to the rear side of the casing 2. The retransport tray 63 is freely detachably mounted by insertion into the casing 2 from a position above the feeder section 4.

The inverting mechanism 62 includes a casing 64, inversion rollers 66, retransport rollers 67, and an inversion guide plate 68. The casing 64 has a substantially rectangular shape when viewed in cross section. The inversion rollers 66 and the retransport rollers 67 are disposed in the casing 64. The inversion guide plate 68 protrudes upward from the upper portion of the casing 64.

A flapper 65 is pivotally supported at the rear side of the casing 2 and disposed downstream from the transport roller 49. The flapper 65 is for selectively switching transport direction of a sheet 3, which has been printed with images on its one side, between a direction toward transport rollers 50 as indicated by solid line and a direction toward the inversion rollers 66 as indicated by broken line.

When a sheet 3 is to be formed with images on both surfaces, first the flapper 65 is switched into the position for guiding the sheet 3 toward the inversion rollers 66. In this condition, a sheet 3 formed with an image on one side is transported to the inversion rollers 66, and the inversion rollers 66 rotate forward with the sheet 3 sandwiched therebetween so that the sheet 3 is transported upward following the inversion guide plate 68. The inversion rollers 66 stop rotating when most of the sheet 3 is discharged from the casing 64 and the tailing end is sandwiched between the inversion rollers 66. Then, the inversion rollers 66 start rotating in the reverse direction to transport the sheet 3 downward to the retransport rollers 67. Here, a sheet passage sensor 76 is provided downstream from the fixing section 23. The timing at which rotation of the inversion rollers 66 is switched from forward to reverse is controlled to the time after a predetermined duration of time elapses from when the sheet passage sensor 76 detects the tailing edge of the sheet 3. It should be noted that when the sheet 3 reaches the inversion rollers 66, the flapper 65 switches to its initial position, that is, to the position for sending sheets 3 to the transport rollers 50.

The sheet 3 transported by the retransport rollers 67 in this manner is then transported by the retransport rollers 67 to the retransport tray 63.

The retransport tray 63 includes a sheet supply portion 69, a tray 70, and oblique rollers 71. The sheet supply portion 69 is attached to the rear end of the casing 2 at a position below the inverting mechanism 62. The sheet supply portion 69 includes an arc-shaped sheet guide member 72. In the sheet supply portion 69, the sheet guide member 72 guides sheets 3 that have been transported substantially vertically from the retransport rollers 67 into the substantially horizontal direction toward the tray 70.

The tray 70 is a substantially rectangular-shaped plate and provided in a substantially horizontal posture above the sheet supply tray 6. The upstream end of the tray 70 is connected to the sheet guide member 72. The downstream end of the tray 70 is connected to an upstream end of the sheet transport pathway 73 so that the sheet 3 can be guided from the tray 70 to the transport rollers 9. The downstream end of the sheet transport pathway 73 is directed to the transport rollers 9.

Two sets of oblique rollers 71 are disposed along the transport path of sheets 3 on the tray 70 and separated by a predetermined distance from each other in the sheet transport direction. The oblique rollers 71 are for transporting sheets 3 while abutting the sheets 3 against a reference plate (not shown) that is provided along one widthwise edge of the tray 70.

Each set of oblique rollers 71 includes an oblique drive roller 74 and an oblique follower roller 75. Each oblique roller 71 is disposed near the reference plate. Rotation axis of each oblique drive roller 74 extends in a direction substantially perpendicular to the sheet transport direction. Each oblique drive roller 74 is disposed in confrontation with the corresponding oblique follower roller 75 so that transported sheets 3 are sandwiched therebetween. Rotation axis of each oblique follower roller 75 extends at a slant from a direction perpendicular to the sheet transport direction so that the sheets 3 are transported toward the reference plate.

The oblique rollers 71 transport a sheet 3, which has been transported from the sheet supply portion 69 to the tray 70, while abutting the widthwise edge of the sheet 3 against the reference plate. Then, the sheet 3 is transported through the retransport pathway 73 once again to the image forming position with front and rear surfaces reversed. The rear surface of the sheet 3 is brought into contact with the photosensitive drum 28, and a visible toner image on the photosensitive drum 28 is transferred onto the rear surface of the sheet 3. The sheet 3 is fixed with the toner image by the fixing section 23 and then discharged onto the discharge tray 52 with images formed on both surfaces of the sheet 3.

Figure 6:
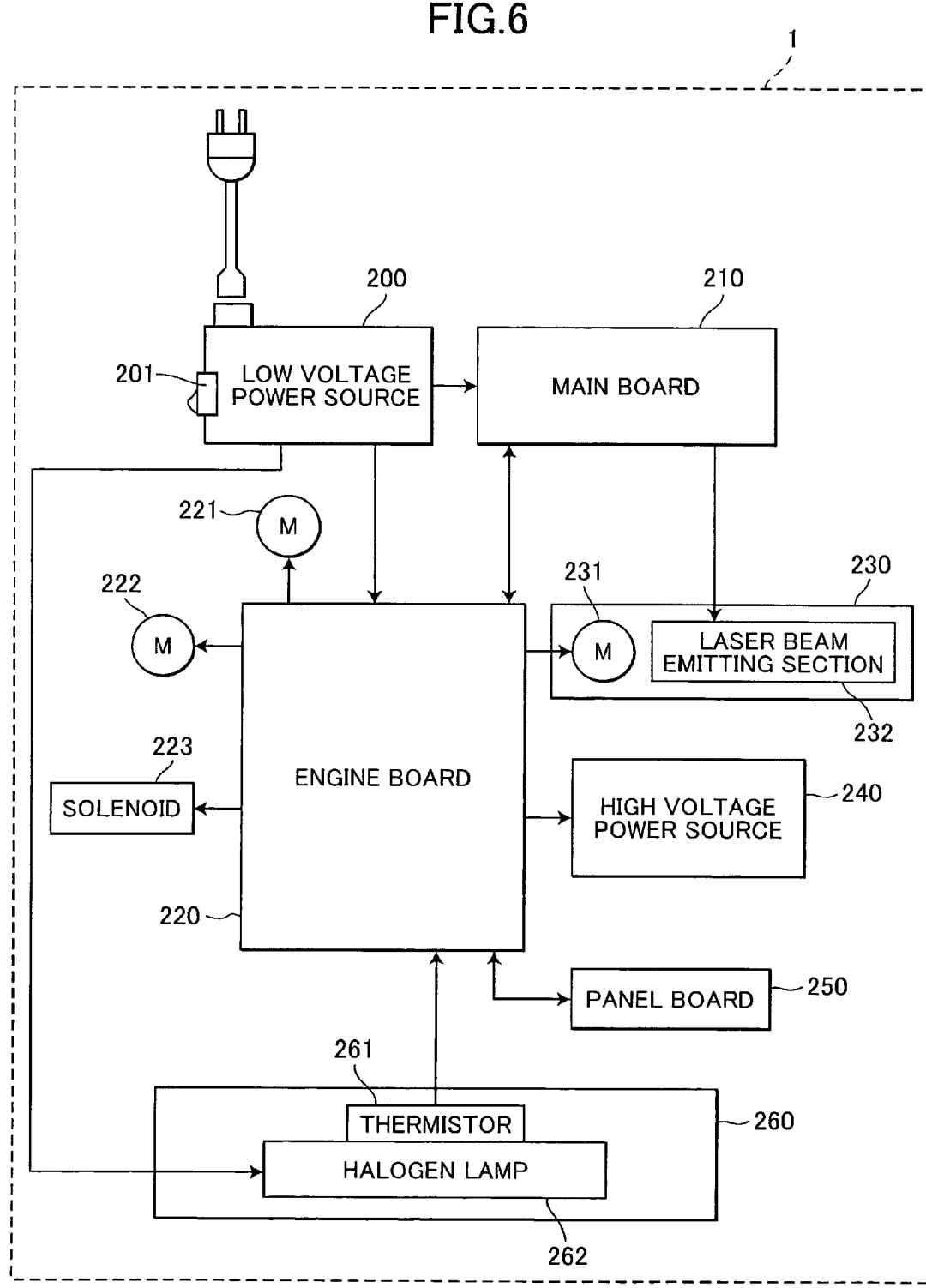
FIG. 6 is a block diagram of the laser printer.

FIG. 6 is a block diagram of the laser printer 1. The laser printer I includes a low voltage power source 200 provided with a power switch 201, a main board 210, an engine board 220, a laser unit 230 disposed in the scanner section 21, a high voltage power source 240, a panel board 250, and a fuser unit 260 disposed in the fixing section 23. The low voltage power source 200 supplies power to the main board 210, the engine board 220, and the fuser unit 260. The laser unit 230 includes a polygon motor 231 and a laser beam emitting section 232. The fuser unit 260 includes a thermistor 261 and a halogen lamp 262 that is adapted to be used as heater for the heating roller 47. The engine board 220 is connected to the low voltage power source 200, the main board 210, the polygon motor 231 of the laser unit 230, the high voltage power source 240, the panel board 250, and the thermistor 261 of the fuser unit 260. The engine board 220 is connected to a fan motor 221, a main motor 222, and a solenoid 223.

Figure 7:
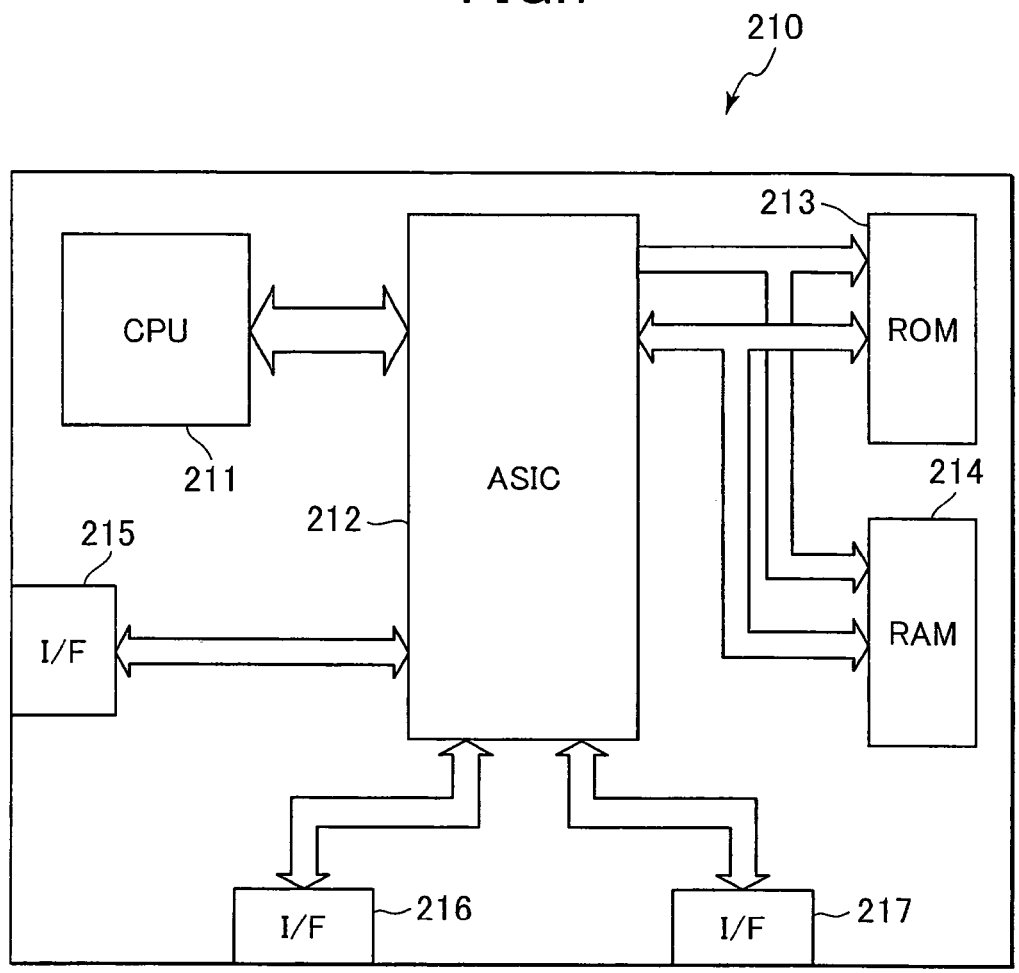
FIG. 7 is a block diagram showing a main board of the laser printer.

FIG. 7 is a block diagram of the main board 210. As shown in FIG. 7, the main board 210 includes a CPU 211, an ASIC (Application Specific Integrated Circuit) 212, a ROM 213, a RAM 214, an interface 215 for a personal computer (not shown) that operates as host, an interface 216 for the engine board 220, and an interface 217 for the laser unit 230.

The ROM 213 stores a program for performing an edge emphasizing operation to be described later. The CPU 211 performs the edge emphasizing operation by reading the program out from the ROM 213.

With the laser printer 1 of the present embodiment, as the personal computer transmits printing data, the ASIC 212 receives the printing data and stores the same in the RAM 214. The CPU 211 sequentially reads the printing data stored in the RAM 214 and develops the printing data into intermediate codes that are adapted to band processing. Then, the CPU 211 stores the intermediate codes in the RAM 214 After the CPU 211 develops the printing data for a single page into intermediate codes, the CPU 231 reads the intermediate codes from the RAM 214, develops the intermediate codes into image data, and stores the image data in the RAM 214. At this time, resolution conversion is performed on the image data according to the resolution of the laser printer 1, and hence the sharpness of the image will be lost. Therefore, an edge emphasizing operation using a "3×3 matrix/Sobel filter" to be described later is performed on the image data and stored in the RAM 214 in order to emphasize the edges of the image.

Thereafter, the laser printer 1 drives the engine board 220 to start conveying a sheet 3 and synchronously rotating the polygon motor 231 in the scanner section 21. Then, the ASIC 212 takes in the processed image data from the RAM 214 in synchronization with a rotation angle of the polygon motor 231, and transmits the image data to the scanner section 21 on a line-by-line basis. Then, in the scanner section 21, the laser beam emitting section 232 turns on and off according to the transmitted image data so that the laser beam emitting section 230 irradiates the photosensitive drum 28 with the laser beam. Then, toner adheres to portions of the surface of the photosensitive drum 28 that have been irradiated with the laser beam to consequently form an image. As the toner adhering to the photosensitive drum 28 is transferred onto a sheet 3 that has been conveyed. The fixing section 23 thermally fuses the toner transferred onto the sheet 3 and fixes the toner to the sheet 3 to complete the printing operation.

The edge emphasizing operation using a "3×3 matrix/Sobel filter" mentioned above for processing an original image to create a new image will be described with reference to FIGS. 8 through 12. The original image includes multiple pixels, and each of the multiple pixels has a pixel value.

Figure 1:
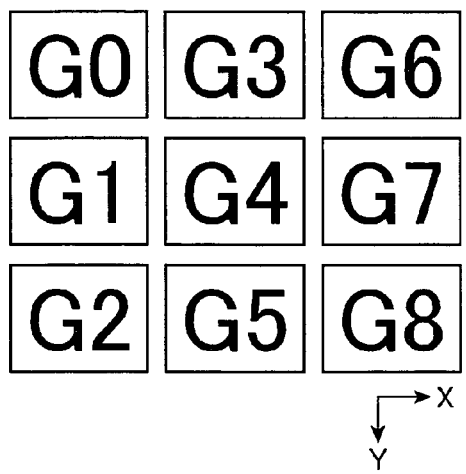
FIG. 1 is an explanatory diagram of a 3×3 matrix formed by a subject pixel and eight surrounding pixels.
Figure 2:
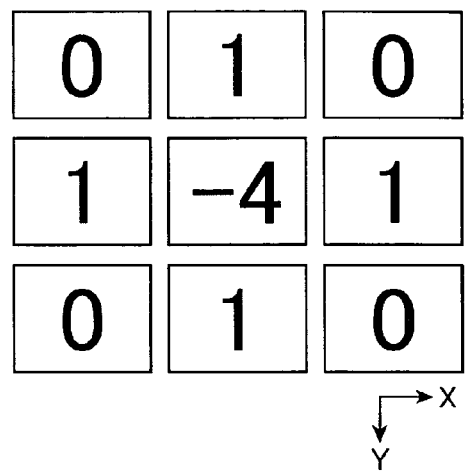
FIG. 2 is an explanatory diagram showing an operator expression of filter coefficients of a "3×3 matrix/four-neighborhood Laplacian filters"
Figure 3:
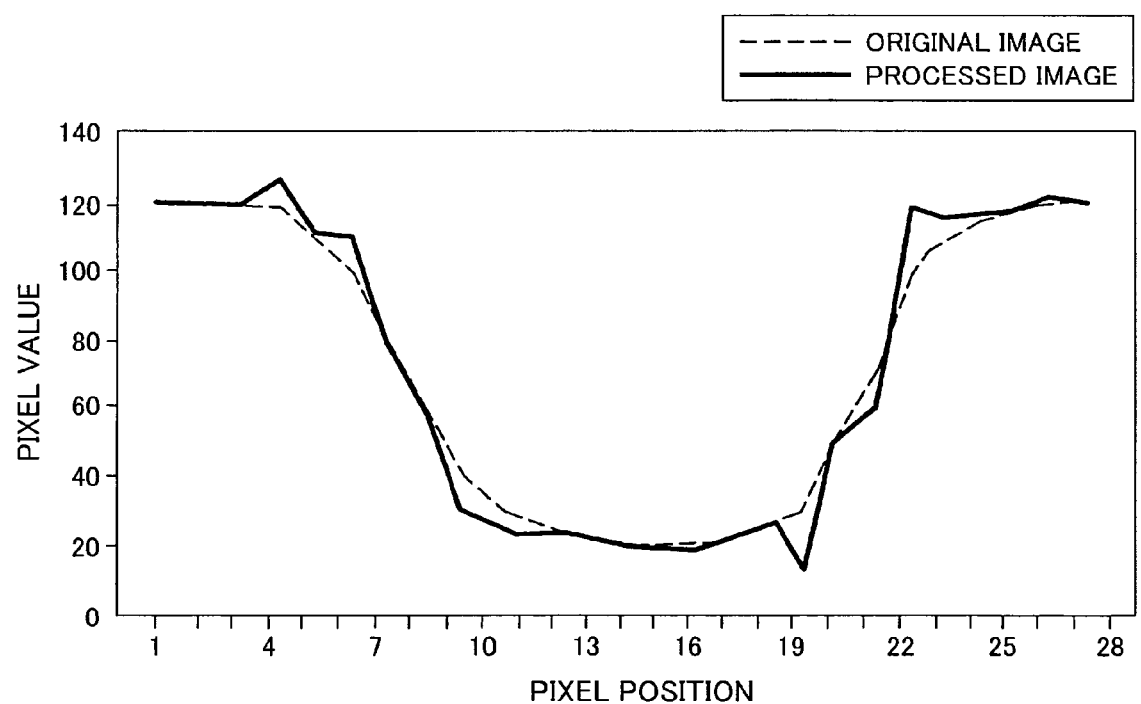
FIG. 3 is a one-dimensional graph showing pixel positions and pixel values for both an original image and a processed image that has been processed by using the "3×3 matrix/four-neighborhood Laplacian filter"

FIG. 1 shows a 3×3 matrix which includes a subject pixel G4 and eight surrounding pixels G0, G1, G2, G3, G5, G6, G7, and G8. The eight surrounding pixels are positioned to surround the subject pixel G4.

Here, it is assumed that the subject pixel G4 is located at a two dimensional location (i, j) that is x-direction and y-direction coordinates of the subject pixel. The surrounding pixels G0, G1, G2, G3, G5, G6, G7, and G8 are located at two-dimensional locations (i−1, j−1), (i−1, j), (i−1, j+1), (i, j−1), (i, j+1) (i+1, j−1), (i+1, j), and (i+1, j+1), respectively.

The subject pixel G4 has an original pixel value f(i, j). The surrounding pixels G0, G1, G2, G3, G5, G6, G7, and G8 have pixel values f(i−1, j−1), f(i−1, j), f(i−1, j+1), f(i, j−1), f(i, j+1), f(i+1j−1), f(i+1, j), and f(i+1, j+1), respectively.

Figure 8:
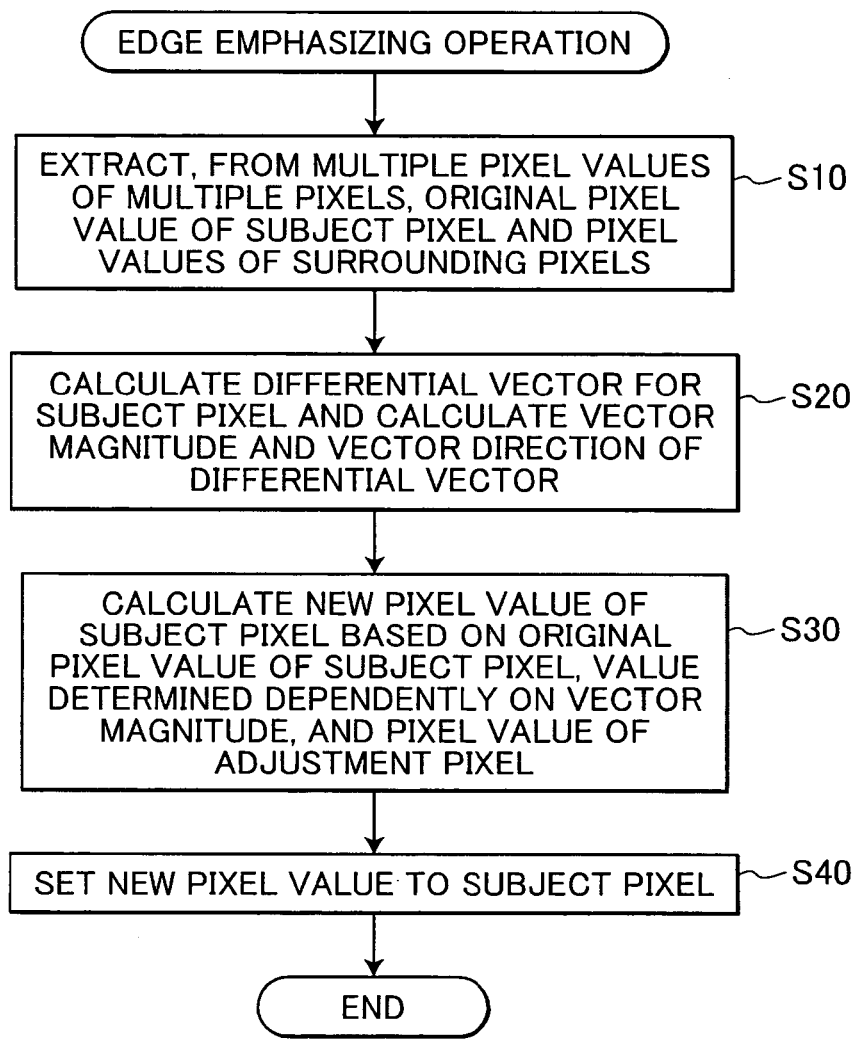
FIG. 8 is a flowchart showing steps of an edge emphasizing operation according to the embodiment of the present invention.

As shown in FIG. 8, in Step S10 (Step is hereinafter referred to as "S"), the CPU 211 extracts, from multiple pixel values of the multiple pixels in the original image, the original pixel value of the subject pixel G4 and the pixel values of the surrounding pixels G0, G1, G2, G3, G5, G6, G7, and G8.

In S20, the CPU 211 calculates a differential vector DV for the subject pixel G4 by performing a differential operation on the pixel values of the surrounding pixels, and calculates a vector magnitude gs(i, j) of the differential vector DV and a vector direction Alfa_gs(i, j) of the differential vector DV.

The differential vector DV has a filter coefficient H(i, j) as an x-directional component and a filter coefficient V(i, j) as a y-directional component. That is, the differential vector is shown as $$DV=(H(i,j), V(i,j)).$$

As shown in FIG. 9(*a*), the filter coefficient H(i, j) in the x-direction for the subject pixel G4 is expressed by an equation $$H(i,j)=-1\times f(i-1,j-1)-2\times f(i-1,j)-1\times f(i-1,j+1)+f(i+1,j-1)+2\times f(i+1,j)+f(i+1,j+1),$$

where f(i−1, j−1), f(i−1, j), f(i−1, j+1), f(i+1, j−1), f(i+1, j) and f(i+1, j+1) are respectively the pixel values of the pixels G0, G1, G2, G6, G7, and G8 before the edge emphasizing operation.

Figures 9A, 9B, 10:
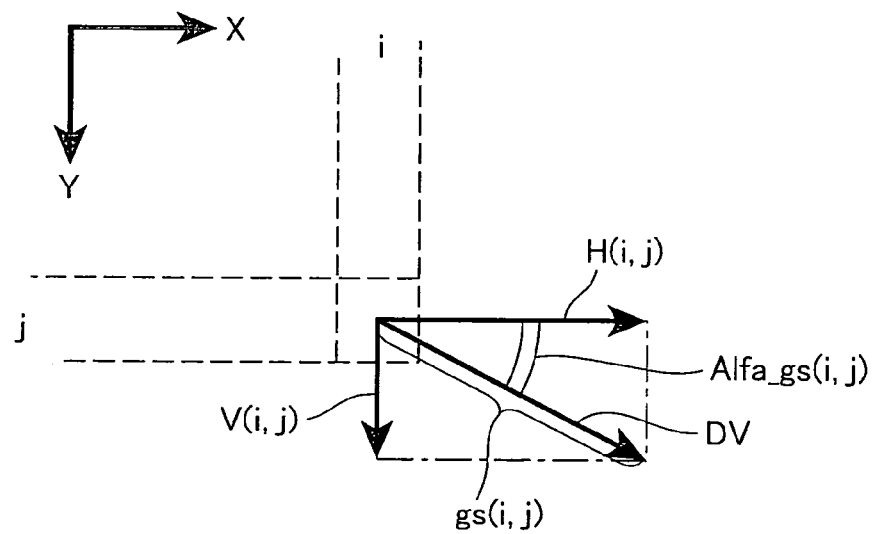
FIG. 10 is an explanatory diagram showing a vector magnitude and a vector direction of a differential vector obtained based on the "3×3 matrix/Sobel filter"

As shown in FIG. 9(*b*), the filter coefficient V(i, j) in the y-direction for the subject pixel G4 is expressed by the equation $$V(i,j)=-1\times f(i-1,j-1)+f(i-1,j+1)-2\times f(i,j-1)+2\times f(i,j+1)-1\times f(i+1,j-1)+f(i+1,j+1),$$

where f(i−1, j−1), f(i−1, j+1), f(i, j−1), f(i, j+1), f(i+1, j−1), and f(i+1, j+1) are respectively the pixel values of the pixels G0, G2, G3, G5, G6, and G8 before the edge emphasizing operation, As shown in FIG. 10, the vector magnitude gs(i, j) of the differential vector DV is obtained from an equation $$gs(i,j)=\sqrt{H(i,j)^2+V(i,j)^2} \quad (1)$$

The vector direction Alfa_gs(i, j) of the differential vector DV, which is an angle between the x-axis and the differential vector DV, is obtained from an equation $$\text{Alfa\_gs}(i,j) = \tan^{-1}\left(\frac{V(i,j)}{H(i,j)}\right). \quad (2)$$

In S30, the CPU 211 calculates a new pixel value g(i, j) of the subject pixel G4 based on the original pixel value f(i, j) of the subject pixel G4, a value determined dependently on the vector magnitude gs(i, j), and a pixel value G of an adjustment pixel.

More specifically, the new pixel value g(i, j) of the subject pixel G4 is calculated based on an equation $$g(i,j)=f(i,j)+KT\times(G-f(i,j)) \quad (3)$$

where f(i, j) is the original pixel value of the subject pixel G4, KT is the value determined dependently on the vector magnitude gs(i, j), and G is the pixel value of the adjustment pixel.

The value KT in equation (3) is determined as described below. The CPU 211 compares the vector magnitude gs(i, j) with a first threshold value, which is 150 in the present embodiment, and a second threshold value, which is 300 in the present embodiment.

Based on the comparison result, the CPU 211 sets the value KT to a value of zero (0), when the vector magnitude gs(i, j) is less than or equal to 150. Thus, from equation (3), the new pixel value g(i, j) takes a value that is the same as the original pixel value f(i, j). The CPU 211 sets the value KT to a value of 0.5, when the vector magnitude gs(i, j) is greater than 150 and is less than or equal to 300. Thus, from equation (3), the new pixel value g(i, j) takes a value 0.5×(f(i, j)+G), which is an average value of the original pixel value f(i, j) of the subject pixel G4 and the pixel value of the adjustment pixel G. The CPU 211 sets the value KT to a value of one (1), when the vector magnitude gs(i, j) is greater than 300. In this case, from equation (3), the new pixel value g(i, j) takes a value that is the same as the pixel value of the adjustment pixel G.

In order to determine the pixel value of the adjustment pixel G in equation (3), the CPU 211 first determines a first candidate surrounding pixel and a second candidate surrounding pixel. The first candidate surrounding pixel is positioned in the vector direction Alfa_gs(i, j). The second candidate surrounding pixel is positioned in an opposite vector direction -Alfa_gs(i, j) that is opposite to the vector direction Alfa_gs(i, j)

Figure 11:
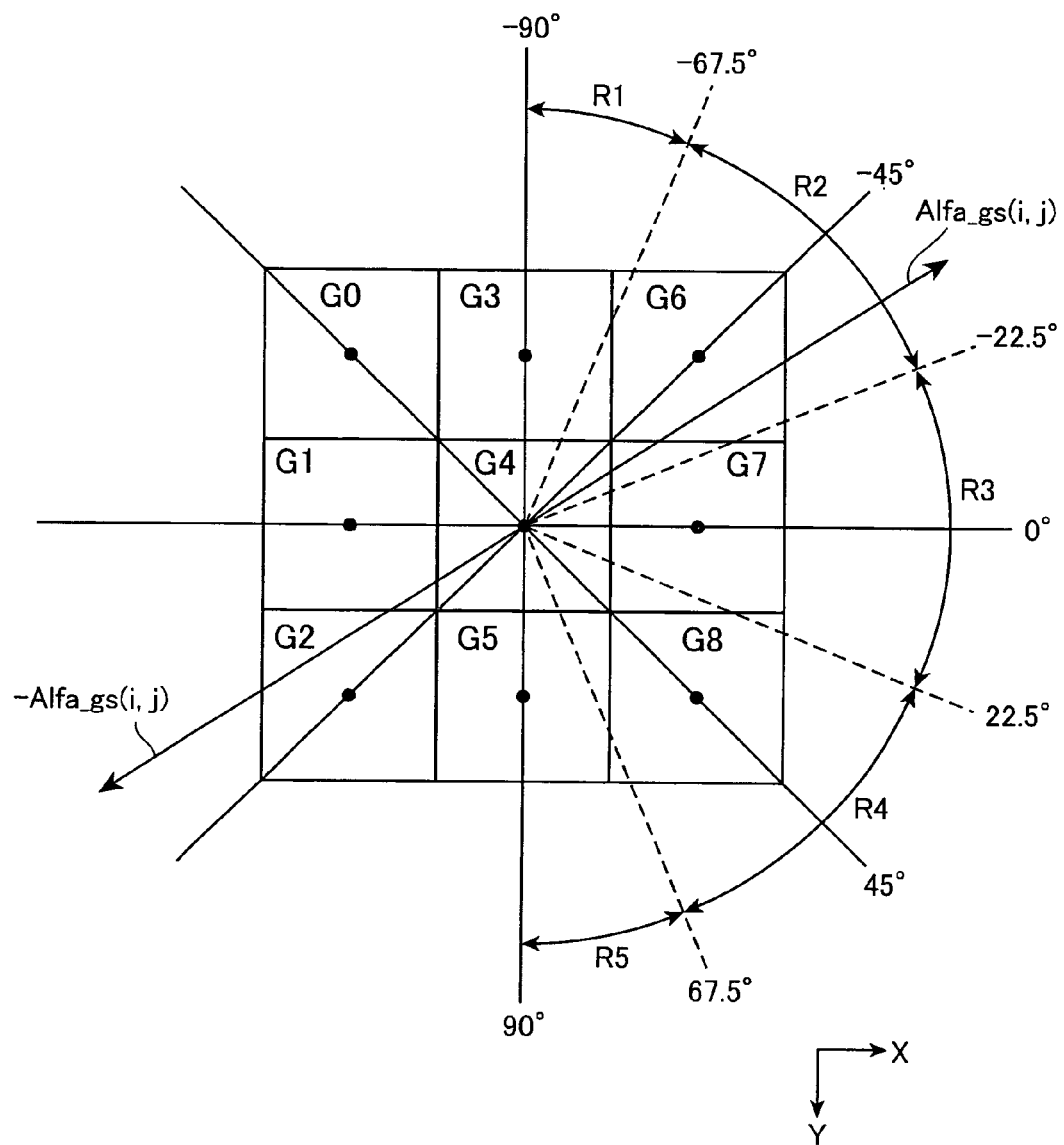
FIG. 11 is an explanatory diagram showing the relationships among the subject pixel, the surrounding pixels, angle ranges, and the vector direction.

FIG. 11 shows the relationships among the subject pixel G4, the eight surrounding pixels, angle ranges R1 through R5, and the vector direction Alfa_gs(i, j). It is noted that the vector direction Alfa_gs(i, j) is defined between −90° and 90°.

As shown in FIG. 11, if the vector direction Alfa_gs(i, j) is in an angle range R1 (greater than or equal to −90° and smaller than −67.5°), the CPU 211 sets the first candidate surrounding pixel to the surrounding pixel G3 and sets the second candidate surrounding pixel to the surrounding pixel G5. If the vector direction Alfa_gs(i, j) is in an angle range R2 (greater than or equal to −67.5° and smaller than −22.5°), the CPU 211 sets the first candidate surrounding pixel to the surrounding pixel G6 and sets the second candidate surrounding pixel to the surrounding pixel G2. If the vector direction Alfa_gs(i, j) is in an angle range R3 (greater than or equal to −22.5° and smaller than 22.5°), the CPU 211 sets the first candidate surrounding pixel to the surrounding pixel G7 and sets the second candidate surrounding pixel to the surrounding pixel G1. If the vector direction Alfa_gs(i, j) is in an angle range R4 (greater than or equal to 22.5° and smaller than 67.5°), the CPU 211 sets the first candidate surrounding pixel to the surrounding pixel G8 and sets the second candidate surrounding pixel to the surrounding pixel G0. If the vector direction Alfa_gs(i, j) is in an angle range R5 (greater than or equal to 67.5° and smaller than or equal to 90°), the CPU 211 sets the first candidate surrounding pixel to the surrounding pixel G5 and sets the second candidate surrounding pixel to the surrounding pixel G3.

Then, the CPU 211 sets the pixel value of the adjustment pixel G to one of the pixel value of the first candidate surrounding pixel and the pixel value of the second candidate surrounding pixel, that is closer to the original pixel value f(i, j) of the subject pixel G4 than the other candidate surrounding pixel.

As shown in FIG. 11, for example, if the vector direction Alfa_gs(i, j) is in the angle range R2, the CPU 211 sets the first candidate surrounding pixel to the surrounding pixel G6 and sets the second candidate surrounding pixel to the surrounding pixel G2. Then, the CPU 211 sets the pixel value of the adjustment pixel G to one of the pixel values of the surrounding pixels G6 and G2, that is closer to the original pixel value f(i, j) of the subject pixel G4 than the other candidate surrounding pixel.

In S40, the CPU 211 sets the new pixel value g(i, j) to the subject pixel G4. By repeating the steps S10 through S40 for other pixels in the image, a new image is obtained.

Figures 12, 13A, 13B:
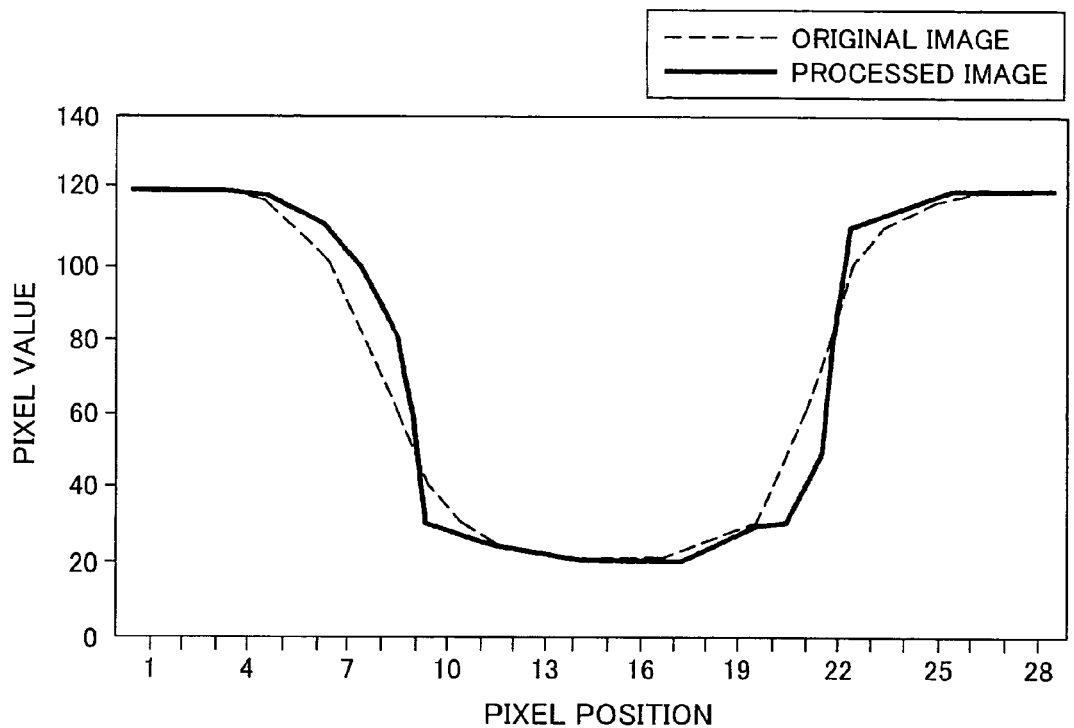
FIG. 12 is a one-dimensional graph showing pixel positions and pixel values for both an original image and a processed image that has been processed by using an image processing device according to the embodiment of the present invention.

FIG. 12 shows an example of one-dimensional illustration of the pixel values of both the original image and the processed image that is obtained by the edge emphasizing operation using the "3×3 matrix/Sobel filter" as described above. The broken line indicates the pixel values of the original image before the edge emphasizing operation, whereas the solid line indicates the pixel values of the processed image obtained after the edge emphasizing operation. As shown in FIG. 12, the slopes of the pixel values after the edge emphasizing operation (the slopes of the solid line) are steeper than the corresponding slopes of the pixel values before the edge emphasizing operation (the slopes of the broken line). Thus, the edges of the processed image are emphasized as a result of the edge emphasizing operation. As shown in FIG. 12, the pixel values of the original image are found within a range between 20 and 120 and those of the processed image are also found within a range between 20 and 120. In other words, only pixel values that are within the range of pixel values of the original image are used in the processed image. In order to obtain the result shown in FIG. 12, a value of 25 was used for the first threshold value, and a value of 50 was used for the second threshold value.

In the above-described embodiment, the CPU 211 sets the value KT to 0, 0.5, or 1, depending on the vector magnitude gs(i,j). At this time, from equation (3), the new pixel value g(i, j) takes the original pixel value f(i, j), the average value of the values f(i, j) and G, or the pixel value of the adjustment pixel G, respectively.

In other words, the value. KT has a value satisfying an inequality $0 \leq KT \leq 1$. Accordingly, the new pixel value g(i, j) takes the original pixel value f(i, j), the pixel value of the adjustment pixel G, or a value between those two values f(i, j) and G. The new pixel value g(i, j) does not take values that are out of a range between the original pixel value f(i, j) and the pixel value of the adjustment pixel G. Accordingly, no pixel values out of the range of the pixel values in the original image are obtained as pixel values of the processed image. Thus, the original image is not changed or altered although the edges of the image are appropriately emphasized (FIG. 12).

While the invention has been described in detail with reference to the specific embodiment thereof, it would be apparent to those skilled in the art that various changes and modifications may be made therein without departing from the spirit of the invention.

For example, in the above-described embodiment, the edge emphasizing operation was performed based on the program stored in the ROM 213. However, the program for performing the edge emphasizing operation may be stored in a storage medium (not shown) from which data can be read by the above-mentioned personal computer or by the laser printer 1.

In the above-described embodiment, a "3×3 matrix/Sobel filter" is used. However, a "3×3 matrix/Prewitt filter" may be used to obtain a similar effect. Filter coefficients used for the "3×3 matrix/Prewitt filter are shown in FIGS. 13(*a*) and 13(*b*).

In the above-described embodiment, the edge emphasizing Operation was performed by using a 3×3 matrix. However, a different size of matrix such as a 5×5 matrix or 7×7 matrix may be used instead of a 3×3 matrix.

Figure 14:
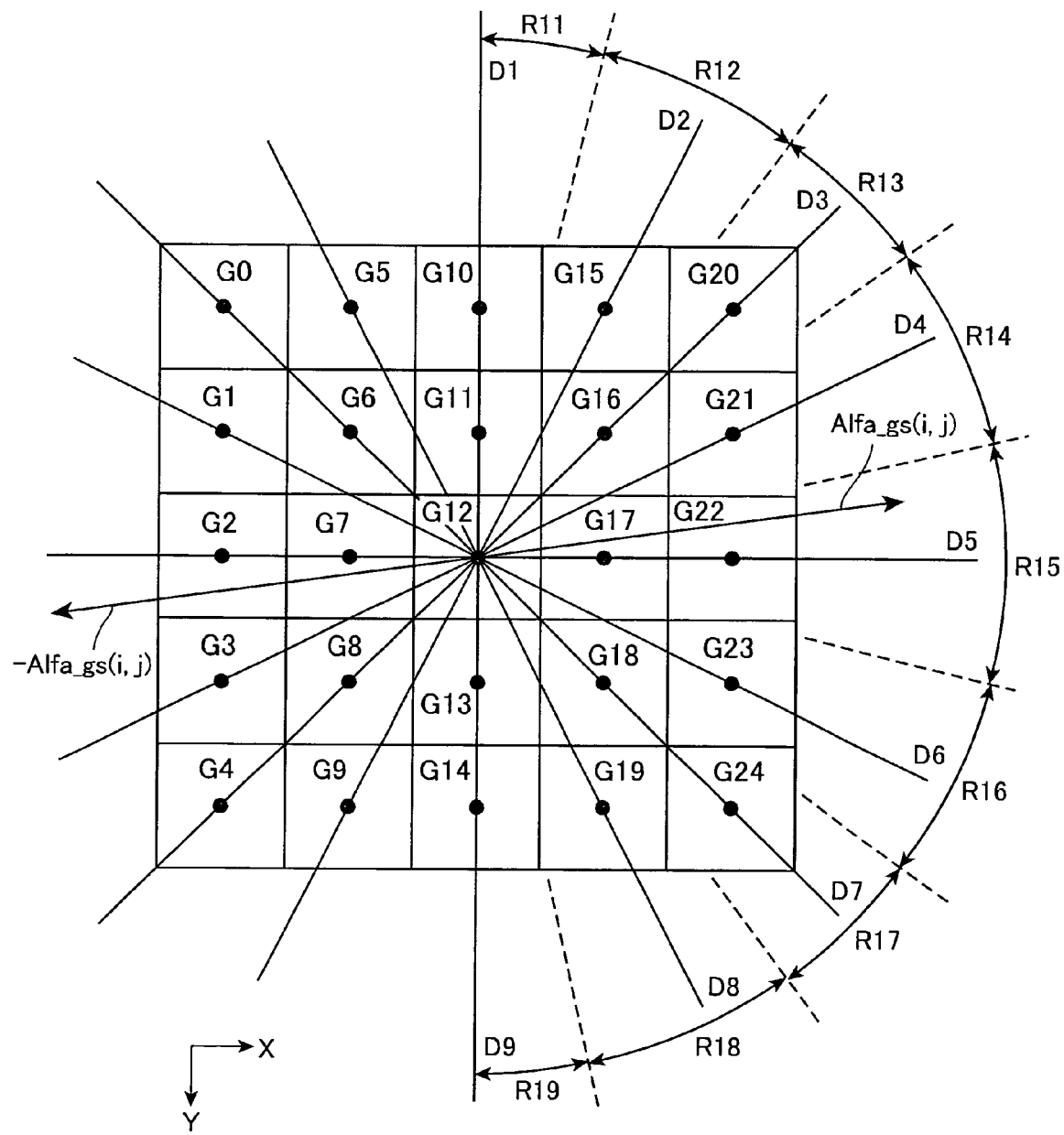
FIG. 14 is an explanatory diagram showing the relationships among a subject pixel, surrounding pixels, angle ranges, and a vector direction of a differential vector according to a modification of a 5×5 matrix.

For example, the edge emphasizing operation by a 5×5 matrix can be performed similarly to the operation by a 3×3 matrix described above. FIG. 14 shows a modification in which the edge emphasizing operation is performed by a 5×5 matrix. The 5×5 matrix includes a subject pixel G12 and surrounding pixels G0 through G11 and surrounding pixels G13 through G24. Dots in each pixel indicate imaginary center positions of each pixel.

The surrounding pixels G10 and G11 are located in a direction D1. The surrounding pixel G15 is located in a direction D2. The surrounding pixels G16 and G20 are located in a direction D3. Other directions D4 through D9 are defined likewise. Angle ranges R11 through R19 are defined in correspondence with the directions D1 through D9. For example, the angle range R15 has a range that is greater than or equal to −11.25° and smaller than 11.25°, the angle range R16 has a range that is greater than or equal to 11.25 ° and smaller than 33.75°, and so on.

In the 5×5 matrix, for example, two surrounding pixels G17 and G22 are located in the same direction D5. In this case, when the vector direction Alfa_gs(i, j) is in the angle range R15 (FIG. 14), the CPU 211 sets the first candidate surrounding pixels to the two surrounding pixels G17 and G22 that are located in the vector direction Alfa_gs(i, j). In other words, the two surrounding pixels G17 and G22 are selected as the first candidate surrounding pixels. Similarly, the CPU 211 sets the second candidate surrounding pixels to two surrounding pixels G2 and G7 that are located in the opposite vector direction -Alfa_gs(i, j). Then, the CPU 211 sets the pixel value of the adjustment pixel G to one of the pixel values of the first candidate surrounding pixels G17 and G22 and the second candidate surrounding pixels G2 and G7, that is the closest to the original pixel value f(i, j) of the subject pixel G12 among the first candidate surrounding pixels G17 and G22 and the second candidate surrounding pixels G2 and G7.

In a basically same manner, the edge emphasizing Operation can also be applied to matrices that have greater sizes than a 5×5 matrix.

In the above-described embodiment and the modification, the subject pixel (G4, G12) and the surrounding pixels are arranged in an n×n matrix configuration, where n is an odd number that is equal to or greater than three, such as 3×3 and 5×5 matrices. Also, the subject pixel is a central pixel that is positioned at a center of the n×n matrix. However, the subject pixel and the surrounding pixels may be in an m1×m2 matrix configuration, where m1 and m2 are numbers different from each other. Also, the subject pixel may not be the central pixel that is positioned at the center.

What is claimed is:

1. An image processing device for processing an original image including multiple pixels to create a new image, each of the multiple pixels having a pixel value, the device comprising:

an extracting unit extracting, from multiple pixel values of multiple pixels, an original pixel value of a subject pixel and pixel values of surrounding pixels that are positioned to surround the subject pixel, the subject pixel and the surrounding pixels being arranged in a matrix configuration;
a first calculating unit calculating a differential vector for the subject pixel by performing a differential operation on the pixel values of the surrounding pixels and calculating a vector magnitude of the differential vector and a vector direction of the differential vector;
a second calculating unit calculating a new pixel value of the subject pixel based on the original pixel value of the subject pixel, a value determined dependently on the vector magnitude, and a pixel value of an adjustment pixel, the adjustment pixel being one of at least one first candidate surrounding pixel and at least one second candidate surrounding pixel, the at least one first candidate surrounding pixel being positioned in the vector direction, the at least one second candidate surrounding pixel being positioned in an opposite vector direction opposite to the vector direction, the adjustment pixel having a pixel value closest to the original pixel value of the subject pixel among the at least one first candidate surrounding pixel and the at least one second candidate surrounding pixel; and
a setting unit setting the new pixel value to the subject pixel, thereby obtaining a new image,
wherein the multiple pixels are arranged in an x-direction and a y-direction,
wherein the subject pixel is located at a two dimensional location (i,j) that is x-direction and y-direction coordinates of the subject pixel, and
wherein the second calculating unit calculates the new pixel value of the subject pixel based on an equation:

$$g(i,j)=f(i,j)+KT \times (G-f(i,j))$$

where $g(i,j)$ is the new pixel value of the subject pixel, $f(i,j)$ is the original pixel value of the subject pixel, KT is the value determined dependently on the vector magnitude, and G is the pixel value of the adjustment pixel.

2. The image processing device as claimed in claim 1, wherein the value KT has a value satisfying an inequality $0 \leq KT \leq 1$.

3. The image processing device as claimed in claim 2, wherein the second calculating unit includes:
a comparing unit comparing the vector magnitude with at least one of a first threshold value and a second threshold value that is greater than the first threshold value; and
a KT setting unit setting the value KT to a value of zero (0), when the vector magnitude is less than or equal to the first threshold value, thereby allowing the new pixel value $g(i,j)$ to take a value that is the same as the original pixel value $f(i,j)$, the KT setting unit setting the value KT to a value between zero (0) and one (1), when the vector magnitude is greater than the first threshold value and is less than or equal to the second threshold value, thereby allowing the new pixel value $g(i,j)$ to take a value between the original pixel value $f(i,j)$ and the pixel value of the adjustment pixel G, and the KT setting unit setting the value KT to a value of one (1), when the vector magnitude is greater than the second threshold value, thereby allowing the new pixel value $g(i,j)$ to take a value that is the same as the pixel value of the adjustment pixel G.

4. An image processing device for processing an original image including multiple pixels to create a new image, each of the multiple pixels having a pixel value, the device comprising:
an extracting unit extracting, from multiple pixel values of multiple pixels, an original pixel value of a subject pixel and pixel values of surrounding pixels that are positioned to surround the subject pixel, the subject pixel and the surrounding pixels being arranged in a matrix configuration;
a first calculating unit calculating a differential vector for the subject pixel by performing a differential operation on the pixel values of the surrounding pixels and calculating a vector magnitude of the differential vector and a vector direction of the differential vector;
a second calculating unit calculating a new pixel value of the subject pixel based on the original pixel value of the subject pixel, a value determined dependently on the vector magnitude, and a pixel value of an adjustment pixel, the adjustment pixel being one of at least one first candidate surrounding pixel and at least one second candidate surrounding pixel, the at least one first candidate surrounding pixel being positioned in the vector direction, the at least one second candidate surrounding pixel being positioned in an opposite vector direction opposite to the vector direction, the adjustment pixel having a pixel value closest to the original pixel value of the subject pixel among the at least one first candidate surrounding pixel and the at least one second candidate surrounding pixel; and
a setting unit setting the new pixel value to the subject pixel, thereby obtaining a new image, wherein the subject pixel and the surrounding pixels are arranged in an n×n matrix configuration,
wherein n is an odd number that is equal to or greater than three (3),
wherein the n×n matrix is a 3×3 matrix,
wherein the multiple pixels are arranged in an x-direction and y-direction, i and j being respectively x-direction and y-direction coordinates of the subject pixel,
wherein the differential vector has an x-directional component $H(i,j)$ and a y-directional component $V(i,j)$ expressed by equations:

$$H(i,j)=-1 \times f(i-1,j-1)-2 \times f(i-1,j)-1 \times f(i-1,j+1)+f(i+1,j-1)+2 \times f(i+1,j)+f(i+1,j+1), \text{ and}$$

$$V(i,j)=-1 \times f(i-1,j-1)+f(i-1,j+1)-2 \times f(i,j-1)+2 \times f(i,j+1)-1 \times f(i+1,j-1)+f(i+1,j+1),$$

where $f(i-1,j-1)$, $f(i-1,j)$, $f(i-1,j+1)$, $f(i,j-1)$, $f(i,j+1)$, $f(i+1,j-1)$, $f(i+1,j)$, and $f(i+1,j+1)$ are respectively the pixel values of the surrounding pixels that are located at two-dimensional locations $(i-1,j-1)$, $(i-1,j)$, $(i-1,j+1)$, $(i,j-1)$, $(i,j+1)$, $(i+1,j-1)$, $(i+1,j)$, and $(i+1,j+1)$,
wherein the vector magnitude of the differential vector is expressed by an equation:

$$gs(i,j)=\sqrt{H(i,j)^2+V(i,j)^2}, \text{ and}$$

wherein the vector direction of the differential vector is expressed by an equation:

$$\text{Alfa\_gs}(i,j) = \tan^{-1}\left(\frac{V(i,j)}{H(i,j)}\right).$$

5. An image processing method of processing an original image including multiple pixels to create a new image, each of the multiple pixels having a pixel value, the method comprising:
extracting, from multiple pixel values of multiple pixels, an original pixel value of a subject pixel and pixel values of surrounding pixels that are positioned to surround the subject pixel, the subject pixel and the surrounding pixels being arranged in a matrix configuration;

calculating a differential vector for the subject pixel by performing a differential operation on the pixel values of the surrounding pixels and calculating a vector magnitude of the differential vector and a vector direction of the differential vector;

calculating a new pixel value of the subject pixel based on the original pixel value of the subject pixel, a value determined dependently on the vector magnitude, and a pixel value of an adjustment pixel, the adjustment pixel being one of at least one first candidate surrounding pixel and at least one second candidate surrounding pixel, the at least one first candidate surrounding pixel being positioned in the vector direction, the at least one second candidate surrounding pixel being positioned in an opposite vector direction opposite to the vector direction, the adjustment pixel having a pixel value closest to the original pixel value of the subject pixel among the at least one first candidate surrounding pixel and the at least one second candidate surrounding pixel; and setting the new pixel value to the subject pixel, thereby obtaining a new image, wherein the multiple pixels are arranged in an x-direction and a y-direction, wherein the subject pixel is located at a two dimensional location (i,j) that is x-direction and y-direction coordinates of the subject pixel, and wherein the step of calculating the new pixel value includes calculating the new pixel value of the subject pixel based on an equation:

$$g(i,j) = f(i,j) + KT \times (G - f(i,j))$$

where $g(i,j)$ is the new pixel value of the subject pixel, $f(i,j)$ is the original pixel value of the subject pixel, KT is the value determined dependently on the vector magnitude, and G is the pixel value of the adjustment pixel.

6. The image processing method as claimed in claim 5, wherein the value KT has a value satisfying an inequality $0 \leq KT \leq 1$.

7. The image processing method as claimed in claim 6, wherein the step of calculating the new pixel value includes:

comparing the vector magnitude with at least one of a first threshold value and a second threshold value that is greater than the first threshold value; and setting the value KT to a value of zero (0), when the vector magnitude is less than or equal to the first threshold value, thereby allowing the new pixel value g(i,j) to take a value that is the same as the original pixel value f(i,j), setting the value KT to a value between zero (0) and one (1), when the vector magnitude is greater than the first threshold value and is less than or equal to the second threshold value, thereby allowing the new pixel value g(i,j) to take a value between the original pixel value f(i,j) and the pixel value of the adjustment pixel G, and setting the value KT to a value of one (1), when the vector magnitude is greater than the second threshold value, thereby allowing the new pixel value g(i,j) to take a value that is the same as the pixel value of the adjustment pixel G.

* * * * *